US006530216B2

United States Patent
Pott

(10) Patent No.: US 6,530,216 B2
(45) Date of Patent: Mar. 11, 2003

(54) METHOD FOR DESULFATING AN $NO_x$ ACCUMULATOR CATALYTIC CONVERTER

(75) Inventor: Ekkehard Pott, Gifhorn (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/749,990

(22) Filed: Dec. 18, 2000

(65) Prior Publication Data
US 2001/0039798 A1 Nov. 15, 2001

Related U.S. Application Data

(63) Continuation of application No. PCT/EP99/03912, filed on Jun. 7, 1999.

(30) Foreign Application Priority Data

Jun. 18, 1998 (DE) .......................... 198 27 195

(51) Int. Cl.[7] .............................. F01N 3/00
(52) U.S. Cl. ..................... 60/295; 60/274; 60/286; 60/301
(58) Field of Search ............ 60/274, 285, 286, 60/295, 301

(56) References Cited

U.S. PATENT DOCUMENTS

| | | | | |
|---|---|---|---|---|
| 4,835,964 A | * | 6/1989 | Kume | 60/285 |
| 5,392,600 A | * | 2/1995 | Nagai | 60/285 |
| 5,402,641 A | * | 4/1995 | Katoh et al. | 60/285 |
| 5,577,382 A | * | 11/1996 | Kihara et al. | 60/277 |
| 5,724,808 A | * | 3/1998 | Ito et al. | 60/277 |
| 5,758,493 A | | 6/1998 | Asik et al. | 60/274 |
| 5,974,788 A | * | 11/1999 | Hepburn et al. | 60/274 |
| 5,983,627 A | * | 11/1999 | Asik | 60/285 |
| 6,105,365 A | * | 8/2000 | Deeba et al. | 60/295 |
| 6,116,023 A | * | 9/2000 | Ishizuka et al. | 60/276 |
| 6,161,378 A | * | 12/2000 | Hanaoka et al. | 60/286 |
| 6,199,372 B1 | * | 3/2001 | Wakamoto | 60/277 |

FOREIGN PATENT DOCUMENTS

| | | |
|---|---|---|
| DE | 4431558 | 3/1996 |
| DE | 19744579 | 6/1998 |
| DE | 19731624 | 1/1999 |
| EP | 0244127 | 11/1987 |
| EP | 0878610 | 11/1998 |
| WO | 9812423 | 3/1998 |

* cited by examiner

Primary Examiner—Thomas Denion
Assistant Examiner—Diem Tran
(74) Attorney, Agent, or Firm—Baker Botts LLP

(57) ABSTRACT

An $NO_x$ accumulator catalytic converter for an internal combustion engine is desulfonated by providing a plurality of intermittent rich/lean operating cycles of the engine wherein rich operation is at a lambda of less than 0.985, and wherein the duration of rich mixture operation is limited to reduce hydrogen sulfide emission.

13 Claims, 1 Drawing Sheet

METHOD FOR DESULFATING AN $NO_x$ ACCUMULATOR CATALYTIC CONVERTER

This application is a continuation of PCT International Application No. PCT/EP99/03912 filed on Jun. 7, 1999, which International application was published by the International Bureau in German on Dec. 23, 1999.

BACKGROUND OF THE INVENTION

The present invention relates to a method for desulfating an $NO_x$ accumulator or an $NO_x$ accumulator catalytic converter installed downstream of an internal combustion engine.

$NO_x$ accumulator catalytic converters are used to store $NO_x$ in the exhaust of internal combustion engines operated with a lean mixture. However, with sulfur-containing fuels of the type that are currently customary used, stable sulfates form on the catalytically active surfaces, leading to a gradual poisoning of the catalytic converter, gradually reducing its $NO_x$ storage ability. However, in contrast to lead poisoning of 3-way catalytic converters, such sulfate poisoning of an $NO_x$ accumulator catalytic converter is completely or at least largely reversible by operation at a sufficiently high catalytic converter temperatures of over approximately 550° C. with a sufficiently high pollutant supply and a low residual oxygen content.

Consequently, in practice $NO_x$ accumulator catalytic converters are periodically desulfurized or desulfated by setting a suitable temperature and reducing the oxygen content of the exhaust stream, in other words lowering the lambda value. In this context, the lambda value is generally below 1.05 and preferably even below 1, in the rich operating region of the internal combustion engine, since desulfating at higher lambda values would take place at too low a reaction rate, which would entail undesirably long desulfating times.

During desulfating of $NO_x$ accumulator catalytic converters, the stored sulfur is released primarily in the form of sulfur dioxide ($SO_2$) and hydrogen sulfide ($H_2S$), in which process other sulfur-containing molecules are also formed in small quantities. With richer exhaust gas, in other words with lowered lambda values, less $SO_2$ is produced and more $H_2S$ is produced. Production of $H_2S$, however, is undesirable on account of its unpleasant odor. In order to avoid such an unpleasant odor, the desulfating of $NO_x$ accumulator catalytic converters in the current state of the art takes place at lambda values of more than approximately 0.98, since $H_2S$ is then produced in only negligible quantities. This advantage is, however, still associated with quite long desulfating times and correspondingly higher fuel consumption.

The object of the present invention is thus to create a process that makes it possible to desulfate an $NO_x$ accumulator catalytic converter in the shortest possible time while suppressing the formation of undesirable byproducts.

SUMMARY OF THE INVENTION

In accordance with the invention, during desulfating the internal combustion engine is operated in a plurality of rich/lean cycles with a cyclic reduction of the lambda value to less than 0.98 during the rich operation. In order to avoid an unpleasant odor resulting from hydrogen sulfide, the duration of the rich operation is chosen to be so short that, little or no noticeable emission of hydrogen sulfide takes place.

The method according to the invention is based on the discovery that, when the lambda value is lowered to below approximately 0.98, the sulfur stored in the catalytic converter is initially released at an accelerated rate in the form of a characteristic $SO_2$ emission peak, while hydrogen sulfide formation begins only after a certain time delay, occurs significantly more slowly, and continues over a longer period of time than $SO_2$ formation.

Therefore, during desulfating of a poisoned $NO_x$ accumulator catalytic converter, after a predetermined desulfating temperature is established a majority of the stored sulfur is initially released by establishing a lambda value of less than 0.98, while the undesirable formation of hydrogen sulfide may be deliberately prevented by a timely return to a lean operating condition. After the end of such a rich/lean cycle there follows one or more further cycles in order to release the remaining sulfur and regenerate the catalytic converter to the desired degree of desulfurization.

Through this process, in accordance with the invention, not only can the formation of undesirable byproducts, and especially the formation of hydrogen sulfide, be effectually suppressed, but the result is significantly shorter regeneration times than with the state of the art, in spite of the use of multiple regeneration cycles, since the individual cycles are short, because of the strong acceleration of $SO_2$ formation with decreasing lambda value.

In the process in accordance with the invention, lambda values between 0.88 and 0.985 prove to be especially advantageous. The region between 0.93 and 0.96 is to be preferred in this regard, while values between 0.945 and 0.955 prove to be especially beneficial.

The duration of rich mixture operation is preferably between 0.5 and 30 sec, while the range between 1 and 20 sec, and in turn especially the range between 2 and 10 sec, proves especially advantageous.

The lean periods of the rich/lean cycles associated with these reduction periods or rich periods are preferably between 0.5 s and 10 s, wherein the range between 2 s and 6 s proves especially advantageous.

The choice of the optimal process parameters, as for example the rich and lean periods, the number of rich/lean cycles and the lambda values used in each case, is primarily guided by the noble metal and storage substances used in each case, the $O_2$ storage capacity of the wash coat, the catalytic converter volume, the space velocity, the composition of lean and rich exhaust gases, the mass of stored sulfur, the spatial distribution of the stored sulfur and the temperature of the storage catalytic converter. With regard to optimizing the process it can also prove advantageous herein for the rich and lean periods and/or the lambda values in the individual rich/lean cycles to be chosen differently.

Additional features and advantages of the process in accordance with the invention result not only from the associated claims—alone and/or in combination—but also from the following detailed description of a preferred example embodiment in conjunction with the associated drawings.

DESCRIPTION OF THE PREFERRED EMBODIMENTS

Figure 1:
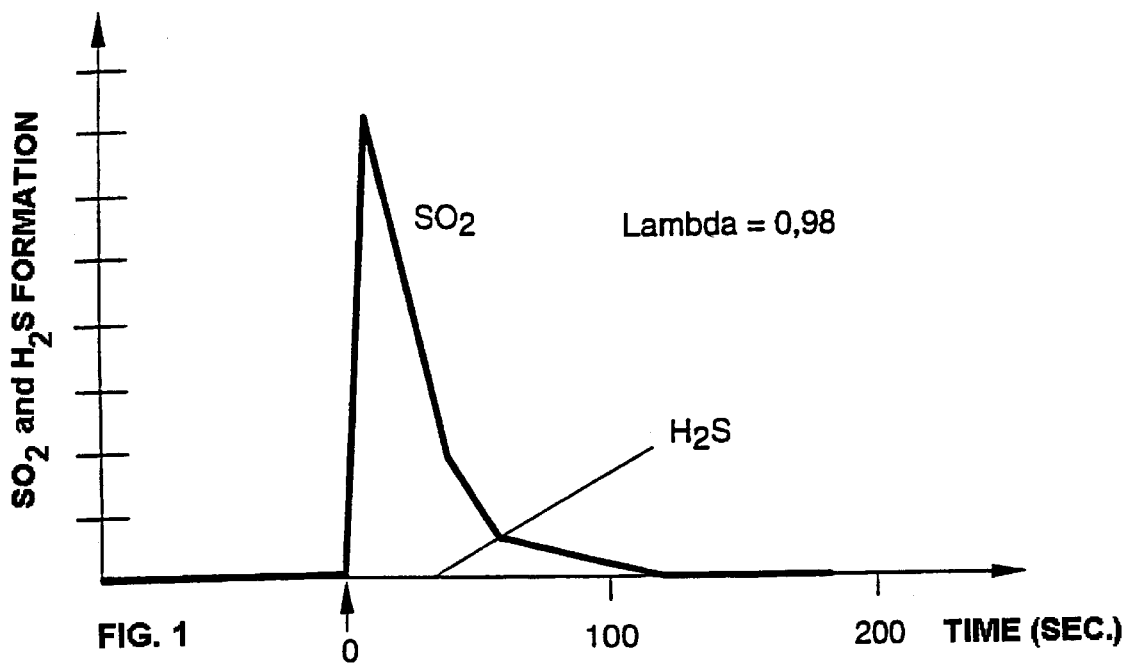
FIG. 1 shows the formation of $SO_2$ and $H_2S$ during the desulfating of an $NO_x$ accumulator catalytic converter as a function of time for $\lambda=0.98$.

The desulfating of an $NO_x$ accumulator catalytic converter is characterized by the occurrence of a pronounced characteristic $SO_2$ emission peak. At the start of desulfating, in other words at time t=0, a very sharp, nearly abrupt increase in $SO_2$ formation can initially be observed. After just a short time, a sharply pronounced maximum can be seen, after the traversal of which the formation of $SO_2$ decreases rapidly at first, then gradually approaches the value of 0, which in the case of desulfating at $\lambda$=0.98 shown in FIG. 1 is reached after approximately 110 s. As can be seen, almost all of the sulfur stored in the catalytic converter is emitted in the form of sulfur dioxide. Hydrogen sulfide formation is practically undetectable, so that no corresponding unpleasant odor need be feared in regenerating the $NO_x$ accumulator catalytic converter.

In this type of regeneration, therefore, after a certain desulfating temperature of over 550° C. is set, the lambda value is simply reduced from the lean operating region of the internal combustion engine to the specified value of 0.98 and then left at this value until the desired extent of desulfating, i.e. usually nearly full desulfation, is achieved. In this process known from the state of the art, however, quite a long time period of $\geq$100 s is required in practice, depending on the desired degree of desulfating. After regeneration of the $NO_x$ accumulator catalytic converter is accomplished, the lambda value is simply increased to reinstate the original, operating conditions in the internal combustion engine's lean region of operation until the catalytic converter is again poisoned by the sulfur contained in the fuel, and repeated regeneration is required to maintain proper function.

The method in accordance with the invention can, as described below, markedly accelerate this conventional desulfating of a sulfur-poisoned $NO_x$ accumulator catalytic converter, reducing fuel consumption, while simultaneously suppressing the formation of undesirable byproducts.

Figure 2:
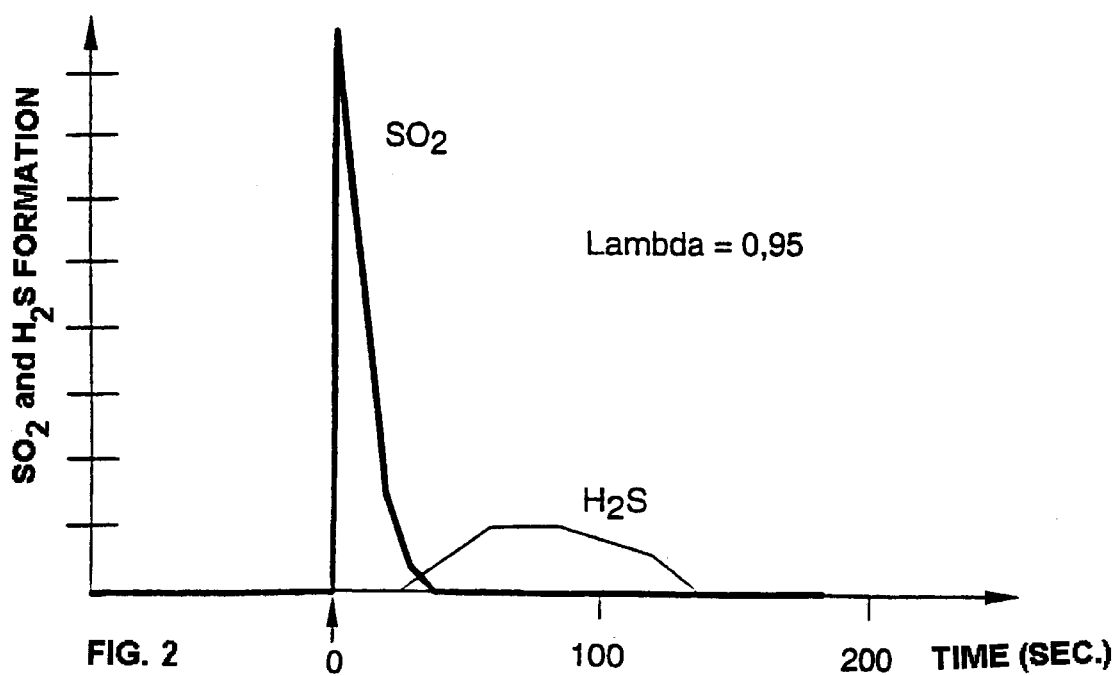
FIG. 2 shows the formation $SO_2$ and $H_2S$ during the desulfating of an $NO_x$ accumulation catalytic converter as a function of time for $\lambda=0.95$.

As can be seen in FIG. 2, a further reduction of the lambda value to 0.95, for example, brings about an evident acceleration in $SO_2$ formation which is visible in the form of a sharp $SO_2$ emission peak. This peak, in comparison to the emission peak for $\lambda$=0.98, shown in FIG. 1, is characterized by a steeper increase, a higher maximum, and a much faster drop. Here, $SO_2$ formation is already practically complete after approximately 30 sec., whereas approximately 110 sec. are required for this at for $\lambda$=0.98. On the other hand, however, in contrast to the case in FIG. 1, noticeable formation of hydrogen sulfide starts shortly before the end of $SO_2$ formation, although this does proceed far more slowly overall than the $SO_2$ formation, and also extends over a longer period after $SO_2$ formation ends.

Thus, at a lambda value of 0.95, the sulfur stored in the catalytic converter is not only emitted in the form of sulfur dioxide, as for $\lambda$=0.98, but also to a considerable extent in the form of hydrogen sulfide, which would lead to an unacceptable unpleasant odor during regeneration of the poisoned catalytic converter according to the aforementioned conventional desulfating process of operating the internal combustion engine in the rich region until a desired degree of desulfurization is achieved.

Therefore, to avoid an unpleasant odor of this nature, in accordance with the invention the lambda value is only reduced to 0.95 for approximately 0.5 to 30 sec., preferably 1 to 20 sec., more preferably 2 to 10 sec., after setting a predetermined desulfating temperature, since at that point $SO_2$ emission has already largely ceased whereas hydrogen sulfide formation has not yet begun. Subsequently, in order to suppress hydrogen sulfide emission, the internal combustion engine is preferably operated with a lean mixture for approximately 0.5–10 sec., but preferably for 2–6 sec., before the lambda value is again reduced to 0.95 for 2–10 sec. to release as sulfur dioxide the sulfur that still remains in the catalytic converter after the first reduction of the lambda value, and thereby to regenerate the catalytic converter nearly completely. After completed desulfating or regeneration of the catalytic converter, the lambda value is finally raised back to its original value and the internal combustion engine is again operated with the normal lean mixture until the next desulfurization.

Due to the strong acceleration of $SO_2$ formation with decreasing lambda value, the desulfurization process in accordance with the invention produces significantly shorter desulfurization times in reaching a desired degree of desulfurization, as compared to the conventional process despite using at least two rich/lean cycles, while also effectively suppressing the formation of undesirable byproducts. This shorter time is, in turn, associated with a corresponding reduction in fuel consumption. In practical operation with sulfur throughput of 2 g to 50 g sulfur between desulfurizations, from 5 to 50, and usually from 10 to 20, rich/lean cycles will be required for desulfurization. The goal is to reduce the emitted $H_2S$ as a percentage of the total sulfur emission from approximately 70% at constant operation $\lambda$=0.95 and/or 50% at constant operation $\lambda$=0.98 to <10%, and ideally to <2%.

The lambda value used to desulfurize a given poisoned $NO_x$ accumulator catalytic converter, the duration of the individual rich and lean periods and the number of rich/lean cycles required to achieve a desired degree of desulfurization are, as has already been mentioned, dependent on the noble metal and storage substances used, the $O_2$ storage capacity of the wash coat, the catalytic converter volume, the space velocity, the composition of lean and rich exhaust gases, the mass of stored sulfur, the spatial distribution of the stored sulfur and the temperature of the storage catalytic converter. In order to achieve optimal regeneration behavior, the rich and lean times of the individual cycles can be chosen to be of different lengths here as necessary, and moreover different lambda values can be set in the individual cycles.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed is:

1. A method for periodically desulfating an $NO_x$ accumulator catalytic converter in the exhaust of an internal combustion operated with a normal lean mixture comprising during each periodic desulfating operation, operating said catalytic converter at a predetermined desulfating temperature and intermittently operating said engine with a rich mixture, capable of generating hydrogen sulfide, and having a lambda value of less than 0.985 and said lean mixture for a plurality of rich/lean cycles, said rich mixture operation having a duration selected to be short so that emission of hydrogen sulfide is reduced.

2. A method according to claim 1 wherein said lambda value is selected to be between 0.88 and 0.985.

3. A method according to claim 2 wherein said lambda value is selected to be between 0.93 and 0.97.

4. A method according to claim 3 wherein said lambda value is selected to be between 0.945 and 0.955.

5. A method according to claim 1 wherein said rich mixture operation has a duration of 0.5 to 30 seconds.

6. A method according to claim 5 wherein said rich mixture operation has a duration of 1 to 20 seconds.

7. A method according to claim 6 wherein said rich mixture operation has a duration of 2 to 10 seconds.

8. A method according to claim 1 wherein said intermittent lean mixture operation of said rich/lean cycles has a duration of 0.5 to 10 seconds.

9. A method according to claim 8 wherein said intermittent lean mixture operation has a duration of 2 to 6 seconds.

10. A method according to claim 1 wherein said rich/lean cycles have different selected rich mixture operation duration.

11. A method according to claim 1 wherein said rich/lean cycles have different selected intermittent lean mixture operation durations.

12. A method according to claim 1 wherein the lambda values for rich mixture operation of said rich/lean cycles are different.

13. A method according to claim 1 comprising returning said engine to operation with said lean mixture following said plurality of rich/lean cycles.

* * * * *